May 28, 1935.  E. H. KREMER  2,002,897
BELT CONNECTER
Filed Feb. 13, 1934    2 Sheets-Sheet 1
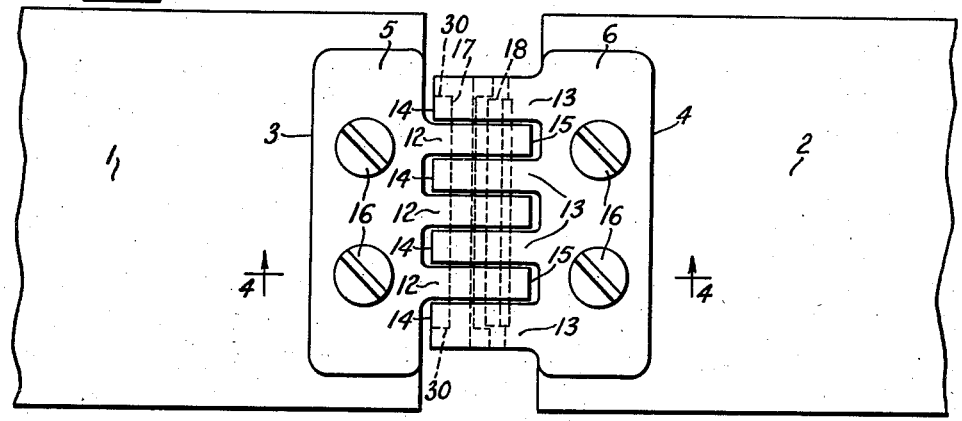
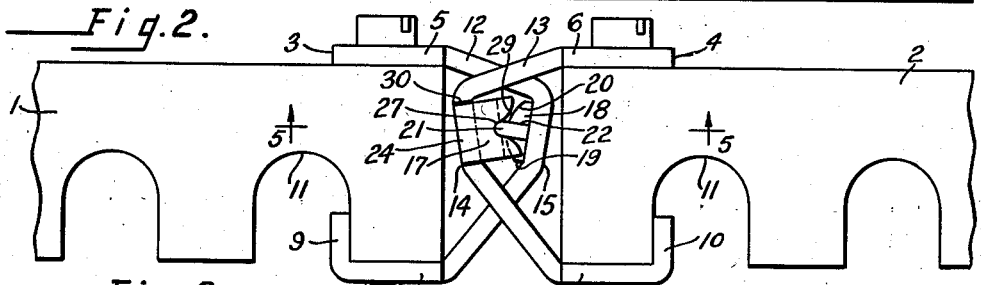
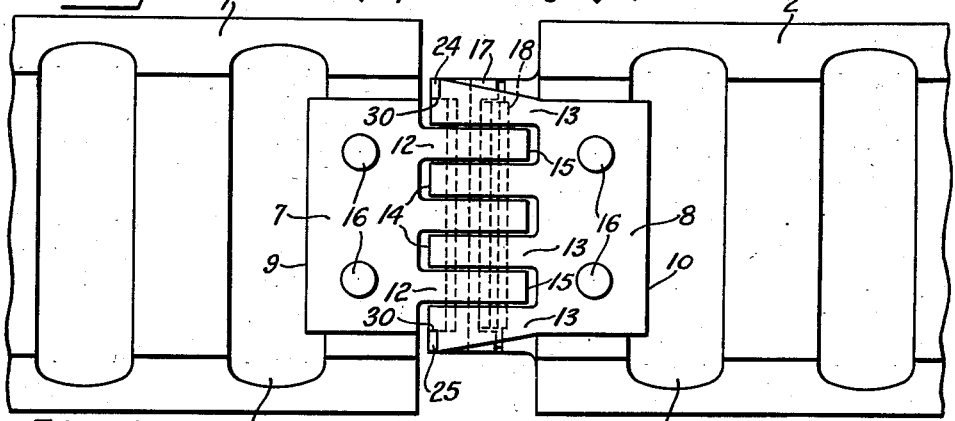
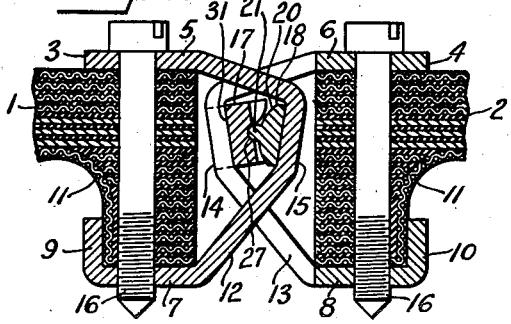
INVENTOR
EDWARD H. KREMER.
BY
ATTORNEYS May 28, 1935.  E. H. KREMER  2,002,897
BELT CONNECTER
Filed Feb. 13, 1934  2 Sheets-Sheet 2
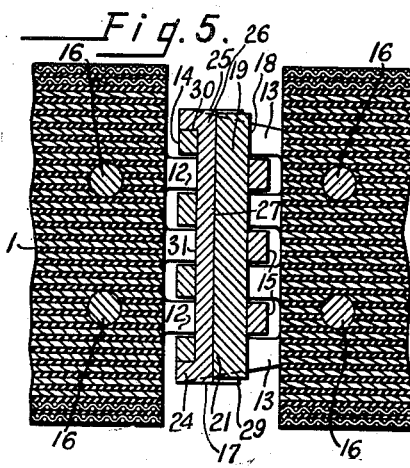
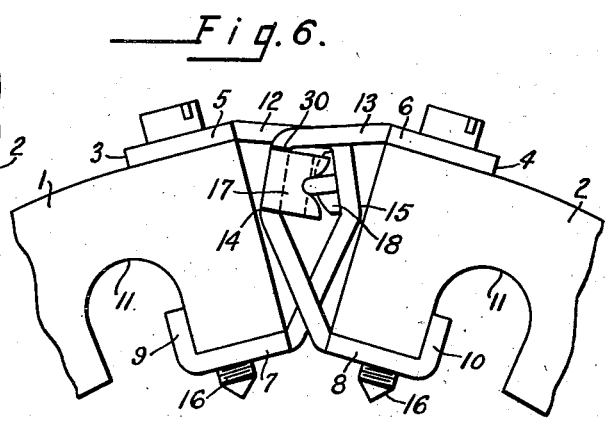
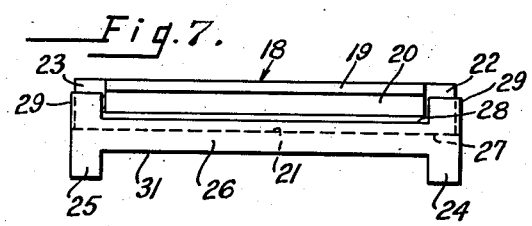
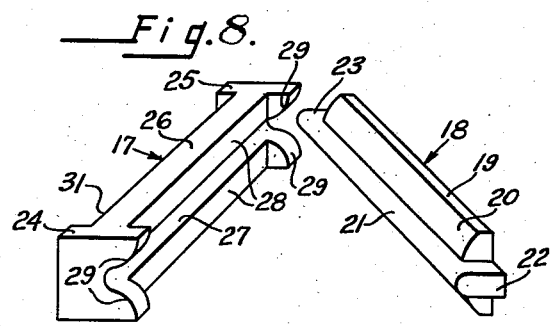
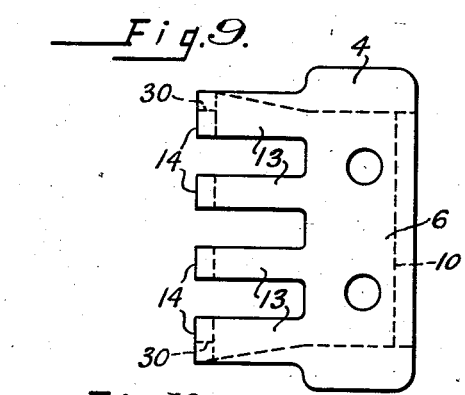
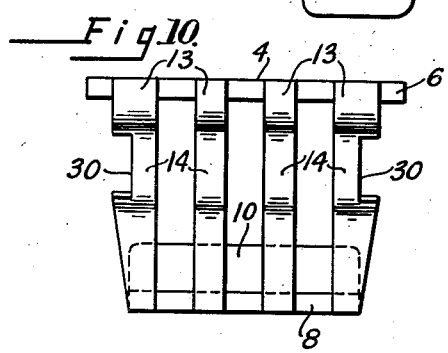
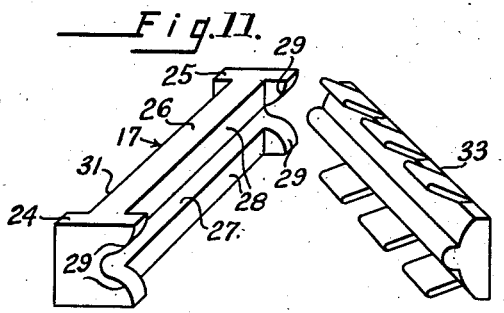
INVENTOR
EDWARD H. KREMER.
BY
ATTORNEYS Patented May 28, 1935

2,002,897

UNITED STATES PATENT OFFICE 2,002,897

BELT CONNECTER

Edward H. Kremer, Dayton, Ohio, assignor to
The Dayton Rubber Manufacturing Company,
Dayton, Ohio, a corporation of Ohio Application February 13, 1934, Serial No. 711,034

13 Claims. (Cl. 24—33)

This invention relates to belt connecters and especially to those having interlacing clamping members and pintle members held therebetween.

The problem encountered by the applicant in making this invention was to provide a belt connecter of the above class, which would embody means to prevent the pintle pins from becoming dislodged or from sliding down within the clamping members; and at the same time to prevent the rapid wear of the pintle members as well as to localize the wear in a position best adapted to endure it.

One object of my invention is to provide a belt connecter having interlacing clamping members and pintle members held therebetween, one of these clamping members having provision for engaging one of the pintle members to hold it securely in place.

Another object is to provide such a clamping member which holds one of the pintle members securely in place and at the same time providing the pintle members with cooperating projections and depressions of unequal depths in order to carry the load and provide bearing support for the clamping members.

Another object is to provide such a clamping member having means for holding a pintle member securely thereto, this pintle member and its cooperating pintle member having provision for preventing their disengagement from one another, either longitudinally or transversely, one of the pintle members having laterally extended shoulders which engage a corresponding groove in the opposite pintle member.

Another object is to provide such a belt connecter with the clamping members having flattened nose portions engaging correspondingly flattened back portions of the pintle members, one of the pintle members being anchored securely to its clamping member.

Another object is to provide such a belt connecter with clamping members and pintle members as above described, whereby the pintle members will be prevented from dislodgment from one another, and each pintle member will likewise be prevented from sliding down and cutting the clamp.

In the drawings:

Figure 1 is a top plan view of the belt connecter of my invention, joining the ends of a belt;

Figure 2 is a side elevation of the belt connecter and belt ends shown in Figure 1;

Figure 3 is a bottom plan view of the belt connecter and belt ends shown in Figures 1 and 2;

Figure 4 is a vertical section along the line 4—4 of Figure 1;

Figure 5 is a horizontal section along the line 5—5 of Figure 2;

Figure 6 is a side elevation similar to Figure 2, but with the ends of the belt angled, as when passing around a pulley of small diameter;

Figure 7 is a top plan view of the two interengaging pintle members alone, without their clamping members;

Figure 8 is a perspective view of the two pintle members separated;

Figure 9 is a top plan view of the clamping member to which one of the pintle members is anchored;

Figure 10 is a front end elevation of the clamping member shown in Figure 9;

Figure 11 is a perspective view of modified forms of pintle members, one of which has edge projections to prevent the transverse dislodgment thereof.

Referring to the drawings in detail, Figure 1 shows a belt of rubber-and-fabric layer construction having ends 1 and 2 which are to be joined by a belt connecter. The belt connecter is provided with interlacing clamping members 3 and 4 adapted respectively to be attached to the belt ends 1 and 2.

The clamping members 3 and 4 are bent in a shape roughly resembling the letter C, the upper arms 5 and 6 thereof being substantially parallel to the lower arms 7 and 8. The ends 9 and 10 of the lower arms 7 and 8 are bent at an angle to engage the cut-away portions 11 with which the belt may be optionally provided. It is understood, however, that a solid belt may be used and these bent portions 9 and 10 omitted, without departing from the scope of my invention. These cut-away portions 11 enable the inner surface of the belt to become shorter than the outer surface and thus more readily adapt the belt to pass around pulleys of small diameters.

The opposite clamping members 3 and 4 are provided with tongues 12 and 13 adapted to interlace with one another, these tongues having nose portions 14 and 15 of flattened construction to provide seats for the pintle members hereinafter described. The clamping members 3 and 4 are secured to their respective belt ends by means of the clamping screws 16 passing through the belt and engaging its maximum thickness.

Between the clamping members are arranged pintle members 17 and 18 respectively. These pintle members are adapted to provide rocking engagement with one another and thereby flexibly carry the load between the opposite ends of the belt. These pintle members are of elongated construction. The male pintle member 18 is provided with a body portion 19, preferably with an arcuate face 20 and a rib 21 extending therealong. The rib 21 is extended beyond each end of the body portion 19 in the end projections 22 and 23 respectively. The female pintle member has flanged heads 24 extending beyond its body portion 26, these being separated by substantially the length of the male body portion 19 which is held between the shoulders thereby provided. The female pintle member is provided with a groove 27 running continuously through the heads 24 and 25 and the body portion 26. This groove 27 is adapted to receive the rib 21 on the male pintle member, but is of shallower depth, so that the opposing surfaces 28 and 20 of the two pintle members will be spaced from one another by the cooperating rib 21 and groove 27. The pintle heads 24 are cut away on either side of the groove 27, as at 29, to permit the end projections 22 and 23 of the male pintle member to rock freely in the groove portions 27 of the heads 24 and 25 without binding. The cut-away portions 29 also prevent the projections 22 and 23 from becoming dislodged transversely. The fact that the male body portion 19 is held between the end flanges 24 of the female pintle member also prevents longitudinal dislodgment thereof.

One of the clamping members, such as the clamping member 4, is provided with cut-away portions or slots 30 adapted to receive the rearward ends of the flanged heads 24 of the female pintle member. These slots or grooves thus securely anchor the female pintle member in engagement with the clamping member, as the back surface 31 of the pintle member is flattened to engage the inside flat surface of the flattened nose portion 14 of the clamping member 4. The pintle member 17 may be anchored in the slots 30 by any suitable means, such as by welding or brazing, or may be left detachable or loose.

The belt connecter of my invention thus prevents "cocking" or dislodgment of the pintle members from engagement with one another; and also prevents "sliding-down" which occurs when either of the pintle members drops down so that its lower edge tends to cut into the clamping members.

It will be understood, however, that different types of pintle pins can be used in place of those previously described. For example, one pintle pin 33 may be provided with wings along its edges (Figure 11) to prevent transverse dislodgment or "cocking" of the pintle pins and the female pintle member thereof anchored in the slots in the clamping member, in the manner previously described.

The belt with which this clamping member is used may be of any suitable type, but is preferably of rubber-and-fabric construction. In such a belt the construction is preferably such that the belt is substantially inextensible along its neutral axis, slightly extensible along its outer part, and slightly compressible along its inner portion. In this manner the belt is adapted to pass freely around pulleys of small diameter.

In assembly, the clamping members 3 and 4 are interlaced so that their tongue portions 12 and 13 pass one another, providing a space between them in which the pintle members 17 and 18 are placed. The rib portion 21 is placed in engagement with the groove 27 and the body portion 19 aligned so that it lies between the flanged heads 24. The rearward portions of the shoulders 24 and 25 are inserted in the grooves 30 of the clamping member 3 (Figure 10) and therein secured by welding or by other suitable means. The belt ends 1 and 2 are then inserted between the upper and lower arms 5 and 7 or 6 and 8 of the clamping members 3 and 4, the latter of which are then clamped together through the maximum thickness of the belt by means of clamping screws 16.

In operation, as the belt ends 1 and 2 pass from the straight run position of Figure 2 to the angled position of Figure 6, as in passing around a pulley of small diameter, the clamping members 3 and 4 will be angled relative to one another. The two pintle portions will carry the load, and the rib 21 of one will rock in the groove 27 of the other, thereby providing bearing support. The end projections 22 and 23 will, by engaging the cut-away portions or wings 29, prevent lateral disengagement, whereas the flanged heads 24 will prevent longitudinal disengagement of the body portion 19 held therebetween. The slots 30 will furthermore prevent the "sliding-down" of the pintle member 17 held therebetween.

In this manner the frequent interruptions of service which result from disengagement or "sliding-down" of the pintle members in ordinary belt connecters will be prevented, and the consequent breaking of the clamp or wearing of the clamping members greatly reduced.

It will be understood that the projections 22 and 23 of the male pintle member 19 (Figure 8) may be omitted without departing from the scope of my invention. In this arrangement "sliding-down" would be prevented, but "cocking" could still take place. In assembling this clamp without the end projections 22 and 23, the clamps may be first attached to the belt ends, and the pintle members afterward inserted.

It will be understood that I desire to comprehend within my invention such modifications as may be necessary to adapt it to varying conditions and uses.

Having thus fully described my invention, what I claim as new and desire to secure by Letters Patent is:

1. A belt connecter comprising interlaced clamping members with pintle members disposed therebetween, one of said pintle members having a head, one of said clamping members having a cut-away portion to receive the head and hold one of said pintle members.

2. A belt connecter comprising interlaced clamping members with pintle members disposed therebetween, one of said pintle members having a head, said clamping members having flattened nose portions, one of said nose portions having a cut-away portion to receive the head and hold one of said pintle members.

3. A belt connecter comprising interlaced clamping members with pintle members disposed therebetween, said clamping members having flattened nose portions, one of said nose portions having a cut-away portion, and one of said pintle members having at one end a projection to enter said cut-away portion to be held therein.

4. A belt connecter comprising interlaced clamping members with pintle members disposed therebetween, one of said clamping members having a slotted nose portion, and one of said pintle members having flanged ends to enter said slotted nose portion.

5. A belt connecter comprising interlaced clamping members with pintle members disposed therebetween, said pintle members having an inter-engaging projection and depression to provide bearing support between said clamping members, said projection being deeper than said depression so as to separate the opposing surfaces of said pintle members, one of said pintle members being anchored to one of said clamping members.

6. A belt connecter comprising interlaced clamping members with pintle members disposed therebetween, one of said pintle members having a rib with projecting ends, the other of said pintle members having a groove to receive the rib and flanged ends to receive the projecting ends, said flanged pintle member being anchored to one of said clamping members.

7. A belt connecter comprising interlaced clamping members with pintle members disposed therebetween, one of the pintle members having a flange, one of said clamping members having a nose portion with a slot therein to receive said flange, said pintle members having an inter-engaging rib and groove, and means on one of said pintle members to prevent the longitudinal dislodgment of one pintle member from the other.

8. A belt connecter comprising interlaced clamping members with pintle members disposed therebetween, one of the pintle members having a flange, one of said clamping members having a nose portion with a slot therein to receive said flange to anchor the pintle thereto, said pintle members having an inter-engaging rib and groove, and means on one of said pintle members to prevent the longitudinal and transverse dislodgment of one pintle member from the other.

9. A belt connecter comprising interlaced clamping members with pintle members disposed therebetween, one of said clamping members having a nose portion with means to anchor one of said pintle members thereto, said pintle members having an inter-engaging rib and groove, and common means on one of said pintle members to prevent the longitudinal and the lateral dislodgment of one pintle member from the other.

10. A belt connecter comprising interlaced clamping members with pintle members disposed therebetween, one of said clamping members having a nose portion with means to anchor one of said pintle members thereto, one of said pintle members having at each end lateral edge projections thereon, the other of said pintle members having end projections fitting between the lateral projections to prevent the dislodgment of said pintle members from one another.

11. A belt connecter comprising interlaced clamping members with pintle members disposed therebetween, one of said clamping members having a nose portion with means adapted to anchor one of said pintle members thereto, one of said pintle members having spaced wings along each edge thereof to prevent the transverse dislodgment of said pintle members from one another.

12. A belt connecter comprising interlaced clamping members with pintle members disposed therebetween, one of said clamping members having a nose portion with means to anchor one of said pintle members thereto, one of said pintle members having longitudinally disposed end projections thereon, the other pintle member having lateral end projections thereon, said end projections and lateral end projections being adapted to prevent the transverse and longitudinal dislodgment of one pintle member from the other.

13. A belt connecter comprising interlaced clamping members with pintle members disposed therebetween, one of said clamping members and one of said pintle members having inter-engaging portions to anchor said pintle member to said clamping member, the opposing faces of said pintle members being spaced with an inter-engaging rib and groove therebetween to separate said spaced faces, said groove being shallower than said rib.

EDWARD H. KREMER.